United States Patent [19]

Hyde et al.

[11] 4,087,380

[45] May 2, 1978

[54] POLYMERIZATION CATALYST

[75] Inventors: David Leslie Hyde, East Pleen; Kenneth Clark Kirkwood, Larbert, both of Scotland

[73] Assignee: BP Chemicals Limited, London, England

[21] Appl. No.: 706,759

[22] Filed: Jul. 19, 1976

[30] Foreign Application Priority Data

Jul. 30, 1975 United Kingdom ............... 31891/75

[51] Int. Cl.$^2$ .......................... B01J 31/02; B01J 31/12
[52] U.S. Cl. .............................. 252/429 B; 252/430; 252/431 R; 526/124; 526/125
[58] Field of Search ................ 252/429 B, 430, 431 R

[56] References Cited

U.S. PATENT DOCUMENTS

| | | | |
|---|---|---|---|
| 3,781,257 | 12/1973 | Pampus et al. | ............... 252/429 B X |
| 3,786,032 | 1/1974 | Jennings et al. | ............. 252/431 R X |
| 3,989,879 | 11/1976 | Berger et al. | ................ 252/429 B X |
| 3,989,880 | 11/1976 | Berger et al. | ................ 252/429 B X |

FOREIGN PATENT DOCUMENTS

| | | |
|---|---|---|
| 969,764 | 9/1964 | United Kingdom. |
| 1,276,345 | 6/1972 | United Kingdom. |

*Primary Examiner*—Winston A. Douglas
*Assistant Examiner*—William G. Wright
*Attorney, Agent, or Firm*—Brooks, Haidt, Haffner & Delahunty

[57] ABSTRACT

Process for preparing a supported Ziegler catalyst by impregnating a magnesium-containing support material with the product of reacting a halogen-containing transition metal compound (other than a fluorine-containing compound) with an aliphatic alcohol under substantially anhydrous conditions. Preferred support materials are magnesium oxide or the product of heating magnesium chloride with silica.

7 Claims, No Drawings

POLYMERIZATION CATALYST

The present invention relates to a supported Ziegler polymerisation catalyst and to the use of the catalyst in the polymerisation of 1-olefins.

It has long been known that olefins such as ethylene can be polymerised by contacting them under polymerisation conditions with a catalyst comprising a transition metal compound, e.g. titanium tetrachloride and a co-catalyst or activator, e.g. an organometallic compound such as triethyl aluminium. Catalysts of this type are generally referred to as Ziegler catalysts and will be referred to as such throughout this specification. The catalyst and co-catalyst together will be referred to as activated Ziegler catalysts. The deposition of such catalysts on support materials such as silicon carbide, calcium phosphate, magnesium or sodium carbonate is also known. UK patent specification No. 969,764 discloses a catalyst of the supported Ziegler type comprising (a) the product of reaction carried out in an inert liquid hydrocarbon under certain conditions between a halide or oxyhalide compound of a group IVa, Va, VIa, metal of the Periodic System, Mandeleev's version, and a dry (as therein defined), finely divided particulate inorganic oxide other than silica, alumina or alumina-silica having an average particle size of less than 1 micron and having surface hydroxyl groups thereon, and (b) (as co-catalyst) an organometallic compound or a metal hydride as therein defined. Examples of suitable inorganic oxides are said to be titania, zirconia, thoria and magnesia.

It is an object of the present invention to provide an improved supported Ziegler catalyst.

Accordingly the present invention provides a process for the production of a supported Ziegler catalyst comprising impregnating a magnesium-containing support material with the product of reacting a halogen-containing transition metal compound other than a fluorine-containing compound with an aliphatic alcohol under substantially anhydrous conditions.

The magnesium-containing support material can be, for example, magnesium oxide, magnesium hydroxide, magnesium chloride, magnesium bromide, magnesium iodide, magnesium hydroxy chloride, magnesium carbonate, hydrated magnesium halides, magnesium salts of organic acids or calcined magnesium salts, for example calcined magnesium chloride or oxalate. Preferred magnesium-containing support materials are magnesium oxide; and the product of heating together anhydrous magnesium chloride and a silica support at a temperature in the range 150° – 1,000° C. Magnesium oxide is particularly preferred. Grades of magnesium oxide that can be employed in the present invention preferably have a particle size greater than 0.01 micron, for example 0.01 to 500 microns, most preferably 1 to 100 microns. Magnesium oxide having a surface area in the range 1 to 1,000 square metres per gram and a hydroxyl content <0.2 OH groups per magnesium atom is particularly preferred. It is preferred to employ magnesium oxide that has been obtained by the thermal decomposition of magnesium hydroxide although magnesium oxides obtained by for example thermally decomposing magnesium carbonate, magnesium nitrate or basic magnesium carbonate or by combustion of magnesium metal are also suitable.

The halogen-containing transition metal compound must react with the aliphatic alcohol under the reaction conditions employed. Hydrogen halide is formed during the reaction and this may be evolved as gaseous hydrogen halide, or remain in solution if the reaction is carried out in solvent or with excess alcohol, or the hydrogen halide may form a complex with the reaction product. The halogen-containing transition metal compound is suitably a halogen containing compound of a metal of groups 4A, 5A or 6A of the Periodic Table (Mendeleef). Examples of suitable compounds are halides, halo-alkoxides or oxyhalides of titanium vanadium, zirconium and chromium or mixtures thereof. Preferred halogen-containing transition metal compounds are those having the general formula $Ti(OR)_n Cl_{4-n}$ wherein $0 \leq n < 4$ and R is a hydrocarbon group, preferably an alkyl group containing 1–6 carbon atoms. Most preferably n has any value from 0 to 3 inclusive. Examples of preferred transition metal compounds are $TiCl_4$, $Ti(OC_2H_5)Cl_3$, $Ti(iOPr)Cl_3$, $ZrCl_4$ and $VOCl_3$ or mixtures thereof.

The quantity of halogen-containing transition metal compound employed is suitably at least sufficient to give a concentration of transition metal in the final catalyst in the range 0.1 to 30%, preferably 0.5 to 15%, most preferably 1 to 7% based on the total weight of catalyst. If desired, an excess, for example up to 100 times the concentration in the final catalyst, of halogen-containing transition metal compound may be employed provided that the final catalyst contains 0.1 to 30% of transition metal.

The aliphatic alcohol employed in the present invention is suitably a straight or branched chain alcohol containing up to 12 carbon atoms, preferably 1 to 6 carbon atoms for example methanol, ethanol, isopropanol and isobutanol.

The quantity of alcohol employed is suitably 0.1 to 4.0 moles, preferably 1.0 to 3.5, most preferably 1.5 to 3.0 moles per mole of transition metal compound.

The impregnation of the magnesium containing support material can be carried out for example by reacting the halogen-containing transition metal compound with the aliphatic alcohol in the presence of the magnesium-containing support material. Alternatively the halogen-containing transition metal compound and the aliphatic alcohol can be reacted together and then added to the magnesium containing support material.

The reaction between the halogen-containing transition metal compound and the aliphatic alcohol is preferably carried out in the presence of an inert solvent, examples of suitable solvents being hexane, cyclohexane, isobutane, isopentane, toluene and mixed aliphatic and aromatic hydrocarbon solvents. The reaction can be carried out at any desired temperature. Normally temperatures in the range 0°–150° C are found to be satisfactory.

The impregnation of the magnesium-containing support material is preferably carried out at a temperature in the range 0° to 240° C, most preferably in the range 40° to 140° C. The impregnation can be carried out in the presence of an inert diluent or a solvent for the reaction product of the halogen-containing transition metal compound and the alcohol. Suitable inert diluents (which in some cases are also solvents for the said reaction product) are, for example, saturated aliphatic hydrocarbons such as petroleum ether, butane, pentane, hexane, heptane, methyl cyclohexane and aromatic hydrocarbons such as benzene, toluene and xylene. When an inert diluent or solvent is employed it is often convenient to carry out the impregnation of the magnesium-containing support material at the reflux temperature of the solvent.

Any excess transition metal compound remaining in the catalyst after the impregnation (i.e. transition metal compound that has not reacted with or not been absorbed by the support material) is preferably removed from the catalyst, for example by solvent washing, filtration, centrifuging or other convenient techniques which do not have a deleterious effect on the catalyst.

All stages of the catalyst preparation are preferably carried out in the absence of moisture.

The present invention further provides a process for polymerising 1-olefins comprising contacting, under polymerisation conditions, the monomeric material with the supported Ziegler catalyst of the present invention in the presence of a Ziegler catalyst activator.

The polymerisation process according to the present invention can be applied to the polymerisation of 1-olefins e.g. ethylene or propylene or mixtures of olefins, e.g. ethylene with other 1-olefins, for example, propylene, 1-butene, 1-pentene, 1-hexene, 4-methyl pentene-1, 1,3-butadiene or isoprene. The process is particularly suitable for the polymerisation of ethylene or copolymerisation of ethylene with up to 40% weight % (based on total monomer) of comonomers, i.e. one or more other 1-olefins.

As in the case with other supported Ziegler catalysts the catalyst of the present invention must be activated with a Ziegler catalyst activator. Ziegler catalyst activators and the methods by which they are used to activate Ziegler catalysts are well-known. Examples of Ziegler catalyst activators are organic derivatives of hydrides of metals of Groups I, II, III and IV of the Periodic Table. Particularly preferred are the trialkyl aluminiums or an alkyl aluminium halide, e.g. triethyl or tributyl aluminium.

The polymerisation conditions can be in accordance with known techniques used in supported Ziegler polymerisation. The polymerisation can be carried out in the gaseous phase or in the presence of a dispersion medium in which the monomer is soluble. As a liquid dispersion medium use can be made of an inert hydrocarbon which is liquid under the polymerisation conditions, or of the monomer or monomers themselves maintained in the liquid state under their saturation pressure. The polymerisation can, if desired, be carried out in the presence of hydrogen gas or other chain transfer agent to vary the molecular weight of the produced polymer.

The polymerisation is preferably carried out under conditions such that the polymer is formed as solid particles suspended in a liquid diluent. Generally the diluent is selected from paraffins and cycloparaffins having from 3–30 carbon atoms per molecule. Suitable diluents include, for example, isopentane, isobutane, and cyclohexane. Isobutane is preferred.

The polymerisation can be carried out under continuous or batch conditions.

Methods of recovering the product polyolefin are well-known in the art.

The polymerisation catalyst of the present invention can be used to make high density ethylene polymers and copolymers at high productivity having properties which render them suitable for injection moulding. The catalysts have a high activity and are capable, under particle form process conditions, of producing polymers having a commercially useful particle size distribution.

The invention is further illustrated by the following examples:

In the Examples the melt index ($MI_{2.16}$) and high load melt index ($MI_{21.6}$) were determined according to ASTM method 1238 using 2.16 kg and 21.6 kg loads respectively; the units are grammes per 10 minutes.

EXAMPLE 1

A magnesium oxide known as Maglite D, supplied by Plastichem Ltd., Esher, Surrey, England and manufactured by thermal decomposition of magnesium hydroxide was dried under a pressure of 100 mm Hg at 150° C for 1.5h, then cooled to room temperature in a desiccator.

150 ml dry cyclohexane and 57ml isoproponal were added to a flask which had been flushed out with dry nitrogen. 36.4 ml titanium tetra-chloride was added slowly with stirring and the mixture was heated under reflux for 0.5 h at which stage some, but not all of the HCl produced had been boiled off. The product is believed to be a complex of $Ti(OPr^i)_2Cl_2$, HCl and excess $Pr^iOH$. 10g of the dry magnesium oxide was then added and the mixture heated under reflux for a further 4h. After cooling, the catalyst was washed six times with cyclohexane (150 ml aliquots) by which time the concentration of titanium in the wash liquor was less than lg/liter. The catalyst was stored under nitrogen and used as a slurry in cyclohexane.

The polymerisation was carried out in a 2 litre stainless steel stirred reaction vessel. The solid catalyst was added as a slurry in cyclohexane to the reactor purged with inert gas and maintained at 60°–75° C. Isobutane (1 liter) containing aluminium triethyl was then added and the mixture brought up to reaction temperature. Hydrogen (60 psi) was added and the total pressure was brought up to 600 psi by the addition of ethylene. Ethylene was added continuously to maintain this pressure as the reaction proceeded. The results are recorded in the Table.

EXAMPLE 2

A grade of magnesium oxide known as Maglite K (10 g) was slurried in 100 ml dry cyclohexane containing isopropanol and charged to a nitrogen purged reaction vessel. 12.2 ml $TiCl_4$ was added slowly from a dropping funnel. The mixture was refluxed for 2 hours during which time some HCl was boiled off, although part remained associated with the produced $Ti(OPr^i)_2CL_2$ and excess $Pr^iOH$.

The catalyst was washed with 150 ml aliquots of cyclohexane to remove unreacted titanium compounds until the titanium level in the washings was <lg/liter, and stored under nitrogen.

Polymerisation was carried out as for Example 1; the results are given in the Table.

EXAMPLE 3

31.7g $ZrCl_4$ were mixed with 37.8g $TiCl_4$ in a nitrogen purged glove box. 100 ml dry cyclohexane were added followed by 44.8g isopropanol from a dropping funnel. The mixture was refluxed for κ hour during which some, but not all of the produced HCl was boiled off. 10.9g MgO (Maglite K, Plastichem Ltd., Esher, Surrey) was added in the form of a slurry in 50 ml dry cyclohexane. The mixture was refluxed for a further hour. The catalyst was then washed with 150 ml aliquots of fresh cyclohexane to remove unabsorbed transition metal compounds and was stored in a dry nitrogen atmosphere. Polymerisation was carried out as for Example 1; the results are given in the Table.

EXAMPLE 4

6.3 ml of $VOCl_3$ was added to 29.2 ml $TiCl_4$ in a dropping funnel and added slowly to a stirred, nitrogen purged mixture of 57.0 ml isopropanol in 100 ml cyclohexane. A precipitate formed and was dissolved by heating the mixture to around 60° C. 10.0g Maglite K MgO (Plastichem Ltd., Esher, Surrey) was added in the form of a slurry in 50 ml dry cyclohexane and the mixture heated under reflux for 3 hours. Some HCl boiled off but the rest remained associated with the mixture. The catalyst was washed with fresh cyclohexane (150 ml aliquots) to remove unreacted transition metal compounds. The catalyst was stored under nitrogen as a slurry in cyclohexane.

Polymerisation tests were carried out as for Example 1; the results are given in the Table.

nation being carried out under substantially anhydrous conditions.

2. Process according to claim 1 wherein said support material is magnesium oxide prepared by the thermal decomposition of magnesium hydroxide.

3. Process according to claim 1 wherein said transition metal compound has the general formula $Ti(OR)_nCL_{4-n}$ wherein n has any value from 0 to 3 inclusive and R is an alkyl group containing 1-6 carbon atoms.

4. Process as claimed in claim 1 wherein said transition metal compound is $TiCl_4$.

5. Process as claimed in claim 1 wherein said aliphatic alcohol is methanol, ethanol, isopropanol or isobutanol.

6. Process as claimed in claim 1 wherein the quantity of halogen-containing transition metal compound employed is at least sufficient to give a transition metal concentration in the final catalyst in the range 0.5 to 15% based on the total weight of catalyst, and the quantity of aliphatic alcohol employed is in the range 0.1 to 4.0 moles per mole of halogen-containing transition metal compound employed.

7. A process for the production of a supported Ziegler catalyst comprising impregnating a magnesium oxide support material with the product of reacting together isopropanol and titanium tetrachloride under substantially anhydrous conditions.

TABLE

| Example | Wt. (g) Catalyst | Wt. (g) AlEt$_3$ | H$_2$ Partial Pressure (psi) | Reaction Temp. (° C) | Run Length (min) | Wt. Polymer (g) | MI$_{2.16}$ | MI$_{2.16}$/MI$_{21.6}$ |
|---|---|---|---|---|---|---|---|---|
| 1 | 0.085 | 0.167 | 60 | 86 | 40 | 489 | 3.2 | 24 |
| 2 | 0.098 | 0.167 | 60 | 92.0 | 60 | 448 | 2.1 | 25 |
| 3 | 0.112 | 0.334 | 80 | 84.0 | 60 | 259 | 1.5 | 26 |
| 4 | 0.043 | 0.167 | 60 | 89.5 | 60 | 241 | 0.48 | 28 |

| | Sieve Analysis (% w/w of Polymer) | | | | |
|---|---|---|---|---|---|
| Example | >1000μm | 1000-500μm | 500-250μm | 250-106μm | <106μm |
| 1 | 18.6 | 60.8 | 20.2 | 0.4 | 0.0 |
| 2 | 11 | 47 | 38 | 4 | 1 |
| 3 | 1 | 18 | 46 | 33 | 1 |
| 4 | 41 | 48 | 6 | 4 | 1 |

We claim:

1. A process for the production of a supported Ziegler catalyst component comprising reacting a transition metal compound which is a chloride, chloro-alkoxide or oxychloride of titanium, vanadium, or zirconium, with an aliphatic alcohol containing 1-6 carbon atoms and impregnating a magnesium oxide support material with the product of said reaction, said reaction and impregnation being carried out under substantially anhydrous conditions.

* * * * *

UNITED STATES PATENT AND TRADEMARK OFFICE
CERTIFICATE OF CORRECTION

PATENT NO. : 4,087,380
DATED : May 2, 1978
INVENTOR(S) : DAVID LESLIE HYDE and KENNETH CLARK KIRKWOOD It is certified that error appears in the above-identified patent and that said Letters Patent are hereby corrected as shown below:

Col. 3, line 32, "of" should read --or--

Col. 4, Example 3, line 61, "k" should read --1/2--

Signed and Sealed this

Third Day of October 1978

[SEAL]

Attest:

RUTH C. MASON
Attesting Officer

DONALD W. BANNER
Commissioner of Patents and Trademarks